May 26, 1959 R. R. SMALLEY 2,888,038
AUTOMATIC SHUT-OFF VALVE MECHANISM FOR TANKS AND THE LIKE
Filed April 13, 1954 2 Sheets-Sheet 1
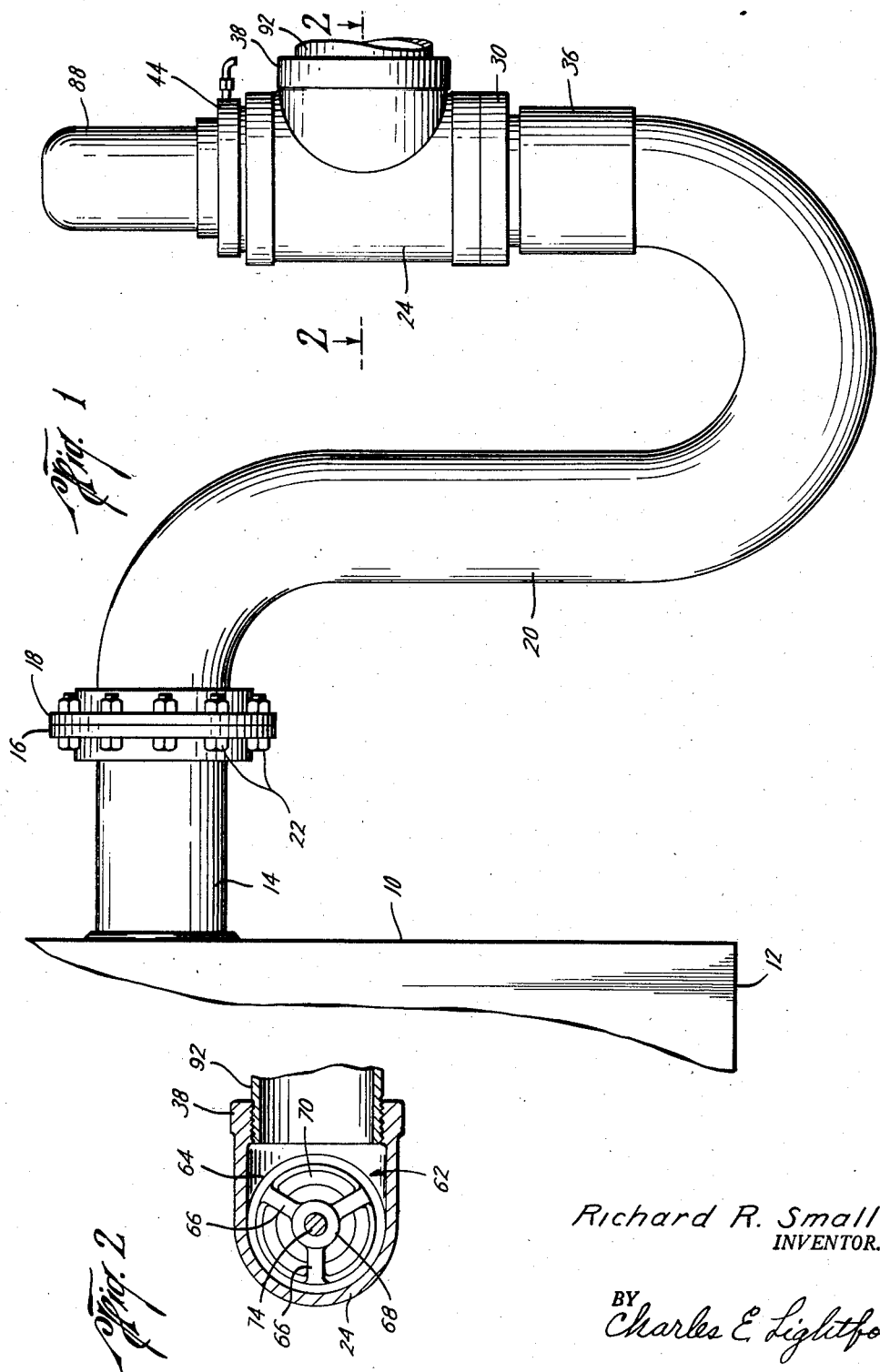
Richard R. Smalley
INVENTOR.
BY Charles E. Lightfoot
ATTORNEY

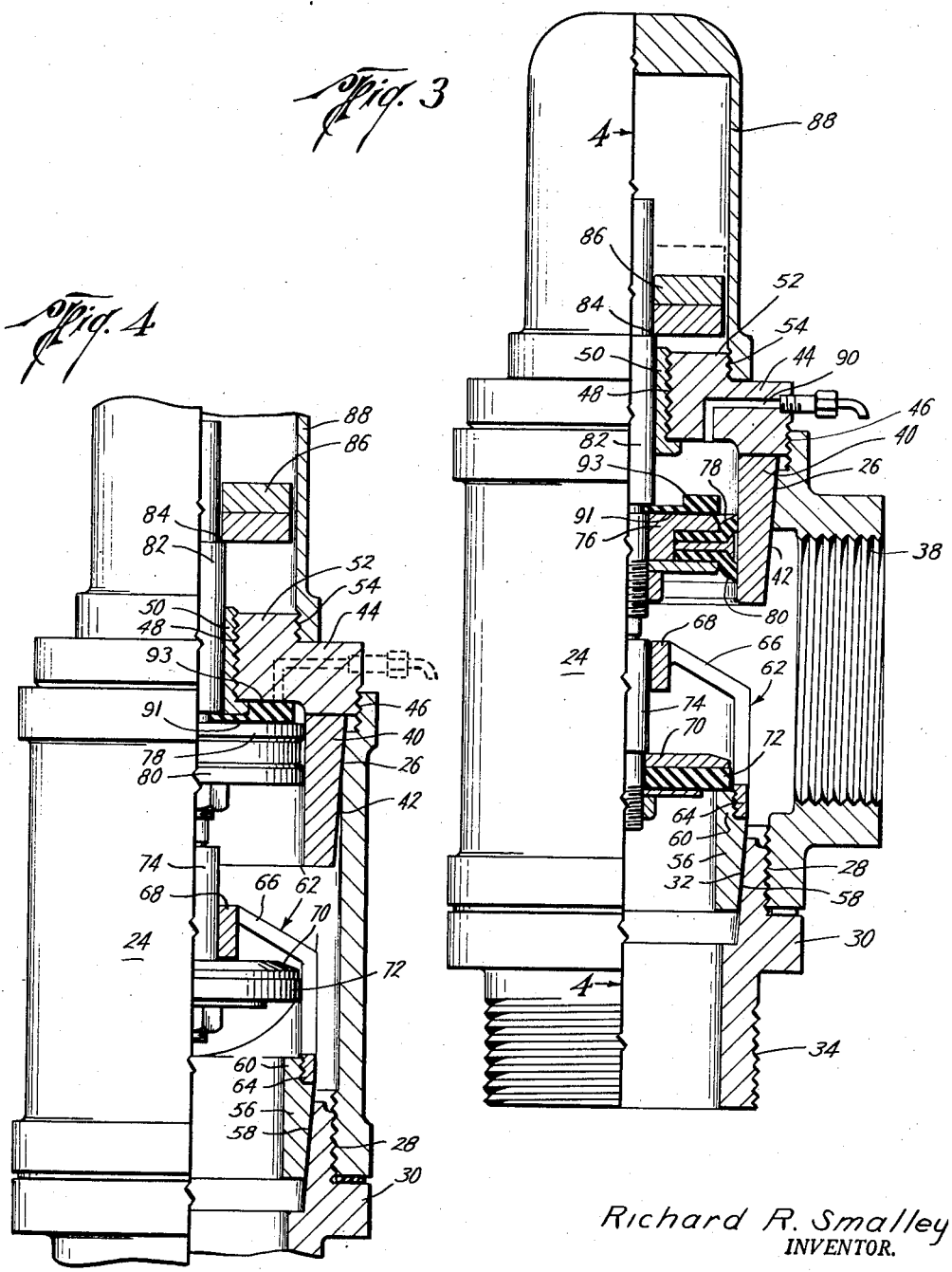

United States Patent Office 2,888,038
Patented May 26, 1959

2,888,038

AUTOMATIC SHUT-OFF VALVE MECHANISM FOR TANKS AND THE LIKE

Richard R. Smalley, Junction, Tex.

Application April 13, 1954, Serial No. 422,881

4 Claims. (Cl. 137—534)

This invention relates to automatic shut-off valve mechanism for tanks and the like, and more particularly to a shut-off valve for use with tanks and which is operable automatically to shut off the flow of liquid from a tank when the liquid in the tank reaches a predetermined level.

While not limited to such use, the invention finds particular application in connection with systems for the storage and distribution of oil and the like, wherein oil is pumped into storage tanks from which it is distributed through pipe lines in any desired manner. In storage and distribution systems of this kind, as heretofore constructed and operated, each tank in the system is usually provided with an outflow connection near the bottom of the tank, controlled by a valve which is manually or otherwise operable and through which the oil may flow out of the tank. Systems of this type, as heretofore operated, are subject to the disadvantage that the level of the liquid in the tank sometimes falls below the tank outlet resulting in the entrance of air into the pipe lines which adversely affects the operation of the system. In order to avoid such occurrences, it is necessary to constantly check the level of liquid in the tanks and to close the valves at the proper time, which requires constant supervision, and expense.

The present invention has for its chief object the overcoming of the above disadvantages by the provision of shut-off valve mechanism which operates automatically to shut off the outflow of liquid from a tank or other receptacle when the liquid reaches a predetermined level in the tank.

Another object of the invention is to provide shut-off valve mechanism which is adjustable for operation to shut off the outflow of liquid from a receptacle when the liquid reaches any selected or desired level.

A further object of the invention is the provision of shut-off valve mechanism including a valve positioned to be opened by the outflow of liquid from a tank and having means whereby the closing force exerted on the valve in the event of back flow of the liquid will prevent return of liquid to said tank.

Another object of the invention is to provide shut-off valve mechanism which may be used in connection with a system of the kind referred to wherein a number of tanks are situated at different elevations to prevent back flow of liquid from a tank at a higher elevation into one at a lower elevation.

A further object of the invention is the provision of shut-off valve mechanism having means whereby the opening and closing forces on the valve will be balanced upon the occurrence of back flow and in which means is also provided for moving the valve to closed position when the opening and closing forces exerted by the liquid thereon are balanced.

A still further object of the invention is to provide shut-off valve mechanism which is of simple design and rugged construction, having few operating parts, and which is capable of withstanding the extreme conditions of exposure and use to which such equipment is customarily subjected.

The above and other important objects and advantages of the invention will best be understood from the following detailed description, constituting a specification of the same, when considered in conjunction with the annexed drawings, wherein:

Figure 1 is a fragmentary side elevational view of the invention, showing the same applied to the outlet connection of a tank;

Figure 2 is a cross sectional view, taken along the line 2—2 of Figure 1, looking in the direction indicated by the arrows;

Figure 3 is a side elevational view, partly broken away and partly in cross sections, on a somewhat enlarged scale, showing details of construction and the internal arrangement of the various parts of the invention with the valve in closed position; and Figure 4 is a view similar to that of Figure 3, rotated 90° from the position of Figure 3, and showing the valve in open position.

Referring now to the drawings in greater detail, the invention as illustrated in Figures 1 and 2 is shown in its application to a tank, generally indicated at 10, having a bottom 12, and provided with an outlet connection 14, located somewhat above the bottom of the tank. The outlet connection 14 may be provided with the usual external, perforated, annular flange 16, to which a similar annular flange 18 on one end of a U-shape outlet pipe 20 is connected by means of bolts 22, or the like.

The cut-off valve mechanism of the invention comprises a tubular valve casing in the form of a T fitting 24 having an internal tapering annular seat 26 adjacent its upper end, and whose lower end is internally threaded as indicated at 28, for the connection thereto of an externally threaded coupling member 30, provided with an internal, annular, tapered seat portion 32. The coupling member 30 forms a fluid inlet for the T-fitting and is provided at its lower end with external threads 34, whereby the coupling may be attached to the outlet pipe 20 from the tank 10, as by means of a conventional connector 36 or otherwise. The tubular T 24 is also provided with an internally threaded outlet 38, whereby the same may be connected in communication with a pipe line forming a part of any convenient type of distributing system. It will be noted that the outlet 38 is positioned at right angles to the fluid inlet of the coupling 30.

Within the upper end of the casing an internal tubular liner 40, having an external tapering face 42, is positioned with the face 42 thereof in contact with the tapering seat 26, the liner being retained in place in the casing by means of an externally threaded plug 44, threadably attached to the upper end of the casing as indicated at 46. The plug 44 has a central opening therethrough, which is internally threaded, as indicated at 48 for the reception of a bushing 50, for a purpose later to be made apparent, and the plug is also formed with an upwardly extending annular projection 52, of reduced diameter, which is externally threaded, as indicated at 54. Within the lower end of the casing a tubular valve seat member 56 is disposed, which is formed with an external tapering surface 58, adapted to form a press fit with the internal tapering surface 32 of the coupling element 30, whereby the seat member is retained in position in the casing. The upper end of the seat member 56 is provided with an externally reduced, externally threaded portion 60, for the attachment of a valve cage 62 having an internally threaded, lower, annular portion 64, from which spaced arms 66 extend upwardly and inwardly, the valve cage also having a tubular guide portion 68, carried by the upper ends of the arms 66.

A valve body 70 is movably disposed within the valve cage 62, which body has a seating element 72, preferably formed of suitable material, such as Bakelite, plastics, or the like, positioned to engage the seat member 56 when the valve is in closed position to form a fluid tight seal with the seat. This valve body is carried on the lower end of a valve stem 74, which extends upwardly through the tubular guide 68.

Within the tubular liner 40 a piston 76 is located, which is provided with oppositely facing packing cups 78 and 80, respectively, positioned for sealing engagement with the inner surface of the liner. The piston is attached to a piston rod 82, which extends upwardly through the bushing 50 in the plug 44, and also extends downwardly into engagement with the upper end of the valve stem 74. Above the plug 44 the piston rod 82 has an external annular shoulder 84, and is provided with one or more annular weight elements 86, surrounding the piston rod, the lowermost of which is supported on the shoulder 84. A cap 88, having an internally threaded lower end portion, is threaded on to the externally threaded reduced portion 52 of the plug to enclose the upper end of the piston rod 82 and the weight elements 86 carried thereby. A passageway 90 is provided in the plug 44, which leads from the interior of the liner 40 above the piston 76 to the exterior of the plug, through which fluid may escape from the interior of the liner upon upward movement of the piston 76 therein, and through which air may enter the liner above the piston upon downward movement of the piston therein. A plate 91 of suitable sealing material is disposed on the piston and formed with an enlarged annular portion 93, which closes the passageway 90 when the piston is in its uppermost position to prevent any possible leakage through passageway 90 while liquid is flowing from the tank.

In making use of the invention, constructed as described above, the coupling member 30 is connected to the outlet pipe 20 to permit flow of fluid into the T-fitting, and the outlet 38 of the casing is connected to a pipe line through the intermediation of a pipe 92, as illustrated in Figures 1 and 2, whereby liquid from the tank 10 may flow through the outlet pipe 20 into the valve casing, to open the valve 70 and pass out through the outlet 38 to the pipe line of the distributing system. The shut-off valve is preferably located on a level somewhat near the level of the outlet connection 14 of the tank, and it will be apparent that by suitably selecting the valve of the weights 86 positioned on the piston rod 82, the valve may be made to close at any desired level of the liquid in the tank. It will also be apparent that by constructing the piston 76 and the valve 70 of substantially equal areas, any back pressure in the outlet of the valve will exert a force on the piston, tending to move the piston rod 82 upwardly, which will be equal to the force exerted on the valve tending to move the valve toward closed position. Thus the downward force of the weights 86 will move the piston rod 82 downwardly to move the valve to closed position as soon as the level of the liquid in the tank reaches a point at which the force exerted thereby becomes less than the force exerted by the weights. In practice the weights 86 will be selected to cause the valve to close when the level of the liquid in the tank is slightly above the outlet connection 14, so that the entrance of air into the distributing system from the tank is prevented. Moreover, in the event of the occurrence of a surge in the distributing system which would cause a sudden drop in the pressure in the outlet of the valve, the downward force exerted thereby on the piston 76 and the upward force on the valve 70 will be equal, and the weights 86 will be effective to move the valve toward closed position.

It will also be apparent that the flow of liquid into the line from the valve will result in a reduction in pressure on the downstream side of the valve and due to the equal areas of the valve and piston the pull on the valve and piston will be the same so that the weights tend to seat the valve and the valve will be closed when the liquid in the tank falls to the predetermined level.

Due to the arrangement of the cup type piston packing elements 78 and 80, the entrance of air into the pipe line through the passageway 90, and the escape of liquid from the interior of the valve casing is effectively prevented.

The invention thus provides shut-off valve mechanism of simple design, which is rapid and positive in operation, which is easily and accurately adjusted to function at any desired level of the liquid in the tank, and which is economical in manufacture.

The invention has been disclosed herein in connection with a certain specific embodiment of the same, but it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is—

1. An automatic shut-off valve comprising a T-shaped fitting having a fluid inlet in communication with a source of fluid supply and a fluid outlet positioned at right angles to the inlet and in communication with a fluid discharge pipe, a valve seat at said fluid inlet, a guided valve complemental to said seat, said valve being reciprocable for seating and unseating engagement with said valve seat due to variation of pressure across said valve, said valve having a stem upon the upper side thereof, a cylinder in said T-fitting above and aligned with said valve and valve seat, a piston slidably mounted in said cylinder having a piston rod in contacting relation with the stem of the valve, the diameter of the valve and piston being approximately the same, whereby suction created in the outlet effecting a balanced downward pull on the piston and a balanced upward pull on the valve and weight means on the piston for closing said valve when fluid pressure in said discharge pipe becomes less than the weight means on the piston.

2. The structure of claim 1, in which the upper end of the piston is provided with a vertical axial rod for support of individual weight means.

3. An automatic shut-off valve comprising a T-fitting having a fluid inlet in communication with a source of fluid supply and a fluid outlet positioned at right angles to the inlet and in communication with a fluid discharge pipe, a valve seat at said fluid inlet, a guided valve complemental to said valve seat, said valve being reciprocable for seating and unseating engagement with said valve seat due to variation of pressure across said valve, said valve having a stem upon the upper side thereof, a cylinder in said fitting above and aligned with said valve and valve seat, a passageway being formed in the upper portion of the cylinder and open to the exterior thereof, a piston slidably mounted in said cylinder, a sealing member fixed to the head of the piston, the sealing member having an annular vertically enlarged portion for closing said passageway when said piston is moved to the uppermost movement thereof, a piston rod on said cylinder in contact relation with the stem of the valve, the diameter of said valve and piston being approximately the same, whereby suction created in the outlet effecting a balanced downward pull on the piston and a balanced upward pull on the valve and weight means on the piston for closing said valve when fluid pressure in said discharge pipe becomes less than the weight means on the piston.

4. The structure of claim 3, in which the upper end of the piston is provided with a vertical axial rod for support of individual weight means.

(References on following page)

References Cited in the file of this patent

UNITED STATES PATENTS

| | | |
|---|---|---|
| 267,796 | McKee | Nov. 21, 1882 |
| 956,789 | Allan | May 3, 1910 |
| 1,631,142 | Masters | June 7, 1927 |
| 1,953,130 | Prellwitz | Apr. 3, 1934 |
| 2,358,950 | Trautman | Sept. 26, 1944 |

FOREIGN PATENTS

| | | |
|---|---|---|
| 23,558 | Great Britain | of 1899 |
| 7,369 | Great Britain | of 1915 |